US011922507B2

(12) United States Patent
Young, Jr. et al.

(10) Patent No.: US 11,922,507 B2
(45) Date of Patent: *Mar. 5, 2024

(54) AUGMENTED REALITY VEHICLE DISPLAY SYSTEMS

(71) Applicant: Capital One Services, LLC, McLean, VA (US)

(72) Inventors: Michael Anthony Young, Jr., Henrico, VA (US); Matthew Louis Nowak, Midlothian, VA (US); Christopher McDaniel, Glen Allen, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/118,888

(22) Filed: Mar. 8, 2023

(65) Prior Publication Data

US 2023/0360134 A1  Nov. 9, 2023

Related U.S. Application Data

(63) Continuation of application No. 17/661,752, filed on May 3, 2022, now Pat. No. 11,625,787.

(51) Int. Cl.
*G06F 3/0482* (2013.01)
*G06Q 30/0283* (2023.01)
(Continued)

(52) U.S. Cl.
CPC .......... *G06Q 40/06* (2013.01); *G06F 3/0482* (2013.01); *G06Q 30/0283* (2013.01);
(Continued)

(58) Field of Classification Search
None
See application file for complete search history.

(56) References Cited

U.S. PATENT DOCUMENTS 9,779,550 B2 * 10/2017 Tobita ....................... G06T 7/74
10,410,182 B1 * 9/2019 Tang ....................... G06T 7/001
(Continued)

OTHER PUBLICATIONS

Stackoverflow.com, "-Frame & ar.js: Multiple markers & boxes", available at <<https://stackoverflow.com/questions/51850930/a-frame-ar-js-multiple-markers-boxes>, archived on Aug. 16, 2018 at wayback machine <<https://web.archive.org>>, 2 pages (Year: 2018).*
(Continued)

*Primary Examiner* — Daniel Rodriguez
(74) *Attorney, Agent, or Firm* — Banner & Witcoff, Ltd.

(57) ABSTRACT

Aspects described herein may allow displaying of augmented reality content items associated with selected vehicle models, as well as price or budget information associated with the displayed vehicle to facilitate the user to make purchasing or financing decisions. For example, a computing device may detect a plurality of physical anchors attached to a vehicle husk and determine location information for each of the plurality of physical anchors. The computing device may receive one or more augmented reality (AR) content items corresponding to one or more vehicle features for the selected vehicle model and display via an AR interface, the one or more AR content items positioned relative to the vehicle husk based on the location of each of the plurality of physical anchors, as well as a price associated with the selected vehicle model having the one or more vehicle features.

21 Claims, 6 Drawing Sheets

(51) Int. Cl.
*G06Q 30/0601* (2023.01)
*G06Q 40/06* (2012.01)
*G06T 11/00* (2006.01)

(52) U.S. Cl.
CPC ..... *G06Q 30/0621* (2013.01); *G06Q 30/0643* (2013.01); *G06T 11/00* (2013.01); *G06T 2200/24* (2013.01)

(56) References Cited

U.S. PATENT DOCUMENTS

| | | | | |
|---|---|---|---|---|
| 10,535,201 | B1* | 1/2020 | Price | G06T 11/00 |
| 10,600,105 | B1* | 3/2020 | Kumar | G06Q 30/0637 |
| 10,755,485 | B2* | 8/2020 | Mott | G06F 3/011 |
| 10,846,534 | B1* | 11/2020 | Furlan | G01S 19/39 |
| 2010/0198769 | A1* | 8/2010 | Gould | G06F 16/211 |
| | | | | 706/47 |
| 2012/0321130 | A1* | 12/2012 | Osman | H04N 5/76 |
| | | | | 382/103 |
| 2015/0130790 | A1* | 5/2015 | Vasquez, II | G06T 19/006 |
| | | | | 345/419 |
| 2016/0046300 | A1* | 2/2016 | Wingfield | B60W 50/085 |
| | | | | 701/48 |
| 2016/0067616 | A1* | 3/2016 | Yim | G06T 19/006 |
| | | | | 463/34 |
| 2016/0171773 | A1* | 6/2016 | Hara | G06V 20/20 |
| | | | | 345/633 |
| 2017/0011553 | A1* | 1/2017 | Chen | G02B 27/0172 |
| 2017/0076408 | A1* | 3/2017 | D'Souza | G06Q 20/10 |
| 2018/0005424 | A1* | 1/2018 | Niinuma | G06T 19/006 |
| 2018/0295314 | A1* | 10/2018 | Sugihara | H04N 23/69 |
| 2020/0035025 | A1* | 1/2020 | Crocker | G06T 19/006 |
| 2020/0243044 | A1* | 7/2020 | Zi | G06F 3/012 |
| 2020/0265645 | A1* | 8/2020 | Price | G06Q 40/02 |
| 2020/0342521 | A1* | 10/2020 | Tang | G06Q 30/0643 |
| 2021/0304500 | A1* | 9/2021 | Tan | G06T 19/003 |
| 2021/0378753 | A1* | 12/2021 | Christen | A61B 34/10 |
| 2022/0084256 | A1* | 3/2022 | Wan | G06T 7/73 |
| 2022/0092877 | A1* | 3/2022 | Young | G06Q 10/087 |
| 2022/0107639 | A1* | 4/2022 | Maniwa | G05D 1/0214 |
| 2022/0188891 | A1* | 6/2022 | Sanor | G06V 20/20 |
| 2023/0115718 | A1* | 4/2023 | Heimdal | G16H 40/63 |
| | | | | 345/589 |

OTHER PUBLICATIONS

VRM Virtual Reality Marketing—Adidas AR Sneakers Try-On App—By Alvin Manalac, Dec. 28, 2019 https://www.virtualrealitymarketing.com/case-studies/adidas-ar-sneakers-try-on-app-2/.

* cited by examiner

FIG. 5B

AUGMENTED REALITY VEHICLE DISPLAY SYSTEMS

CROSS-REFERENCE TO RELATED APPLICATIONS

This application claims priority to U.S. patent application Ser. No. 17/661,752, filed May 3, 2022, and entitled "Augmented Reality Vehicle Display Systems," which is hereby incorporated herein by reference in its entirety.

FIELD OF USE

Aspects of the disclosure relate generally to data processing. More specifically, aspects of the disclosure may provide for systems and methods for displaying augmented reality content items.

BACKGROUND

Car purchasing can be a tough process for many consumers. There are hundreds of different models on the market, and each model of the car may have a variety of features (e.g., different exterior colors, different interior decorations, etc.) to be chosen. Even the largest car selling entity does not have all the different models of cars available in one single place. Consumers often need to rely on viewing the pictures of cars online to make a purchase decision. However, viewing pictures does not provide consumers a comprehensive experience to know about the car. What's more, financing decisions make the purchasing process even more complicated for ordinary consumers. An enhanced way to enable consumers to view and compare different car models in the real world to facilitate the car purchasing process is needed.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Many consumers experience difficulties in the car purchasing process because there are hundreds of different models on the market, and each model of the car may have a variety of features (e.g., different exterior colors, different interior decorations, etc.) to be chosen. Even the largest car selling entity does not have all the different models of cars available in one single place. If a consumer wants to compare different car models or different additional features for a particular car by viewing each of them in the real world, the consumer may need to go to multiple places. That is time-consuming. In addition, having a large space to display a variety of car models is also expensive for the seller. Many car sale websites provide pictures of a variety of car models online, so that the consumers can compare different car models by viewing the pictures at home. However, viewing pictures does not provide consumers a comprehensive experience to know about the car, as most of the consumers obtain an intuitive understanding of whether they like the car or not only if they can see the car in the real world (e.g., viewing the car in real-world size from different perspectives or touch the surface of the car).

What makes things more complicated is the financing decisions involved. Consumers need to integrate their financial information (e.g., loan amount, budget, interest rates, etc.) with the price for different car models or features to make a purchase decision. For example, consumers may have difficulties in understanding whether an upgraded model with the additional $5000 worth unless they can compare the original model and the upgraded model by viewing both, and knowing the financial implications of getting a loan for the additional $5000. When viewing different cars in the real world, it is hard to have all the information available.

To overcome limitations in the prior art described above, and to overcome other limitations that will be apparent upon reading and understanding the present specification, aspects described herein are directed towards displaying augmented reality (AR) content items of a selected vehicle model. The AR content items may alter a real-world vehicle husk that the user could touch and feel while viewing the AR content items. The AR content items may be displayed such that the AR vehicle appears to be overlapped with the vehicle husk. The AR content items, when viewed in combination with the vehicle husk, appear to be a car of the selected vehicle model. Using an AR display device, a user may be able to touch and feel the vehicle husk in the real world while viewing the AR vehicle. Different vehicle models or different features may be selected and displayed. In this way, the user may be provided a comprehensive experience to view different AR vehicles as if they were viewing different cars in the real world, without the need to go to different car selling places. Financial information may also be provided and updated as the user switches between different car models or adds different car features, so that it is easier to understand the financial implications of each option.

Aspects discussed herein may provide a computer-implemented method for displaying augmented reality content items associated with selected vehicle models, as well as price or budget information associated with the displayed vehicle to facilitate the user to make purchasing or financing decisions. In at least one embodiment, a computing device may detect a plurality of physical anchors attached to a vehicle husk, display user-selectable options for a plurality of vehicle models, receive a user selection, from the plurality of vehicle models, of a vehicle model, determine location information for each of the plurality of physical anchors, receive one or more AR content items corresponding to one or more vehicle features for the selected vehicle model, display via an AR interface, the one or more AR content items positioned relative to the vehicle husk based on the location of each of the plurality of physical anchors, and display, via the AR interface, a price associated with the selected vehicle model having the one or more vehicle features. The computing device may be a user device, such as an AR headset.

In some instances, the computing device may further obtain budget information for a user associated with the user device, and obtain, based on the budget information and from a database, the plurality of vehicle models.

In some instances, the computing device may further display second user-selectable options for a plurality of additional features of the selected vehicle model, display, based on a second user selection and via the AR interface, one or more second AR content items associated with one or more selected additional features of the plurality of additional features, and displaying, via the AR interface and based on the one or more selected additional features, an updated price associated with the selected vehicle model having the one or more additional features.

In some instances, the computing device may further determine that the price exceeds a budget of a user associated with the user device, and provide, based on the determining, a notification regarding financing recommendations.

In some instances, the computing device may further receive a second user selection of an environmental condition, receive, based on the second user selection, one or more second AR content items, and display the one or more second AR content items such that the one or more second AR content items, combined with the vehicle husk, appear to be the selected vehicle model exposed to the environmental condition.

In some instances, the location of each of the plurality of physical anchors may comprise a real-world distance between the user device and the respective physical anchor.

In some instances, the at least a portion of an exterior surface of the vehicle husk may have a graphical pattern different from at least a portion of an internal surface of the vehicle husk. The plurality of physical anchors may comprise the graphical pattern.

Corresponding apparatus, systems, and computer-readable media are also within the scope of the disclosure.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

To facilitate the consumer's car purchasing process, aspects discussed herein may provide a computer-implemented method directed towards displaying augmented reality (AR) content items of a selected vehicle model. The AR content items may alter a real-world vehicle husk that the user could touch and feel while viewing the AR content items. The AR content items may be displayed such that the AR vehicle appears to be overlapped with the vehicle husk. The AR content items, when viewed in combination with the vehicle husk, appear to be a car of the selected vehicle model. Using an AR display device, a user may be able to touch and feel the vehicle husk in the real world while viewing the AR vehicle. Different vehicle models or different features may be selected and displayed. In this way, the user may be provided a comprehensive experience to view different AR vehicles as if they were viewing different cars in the real world, without the need to go to different car selling places. Financial information may also be provided and updated as the user switches between different car models or adds different car features, so that it is easier to understand the financial implications of each option.

By way of introduction, aspects discussed herein may relate to systems, methods, techniques, apparatuses, and non-transitory computer-readable media for displaying augmented reality vehicles.

Before discussing these concepts in greater detail, however, several examples of a computing device that may be used in implementing and/or otherwise providing various aspects of the disclosure will first be discussed with respect to FIG. 1.

Figure 1:
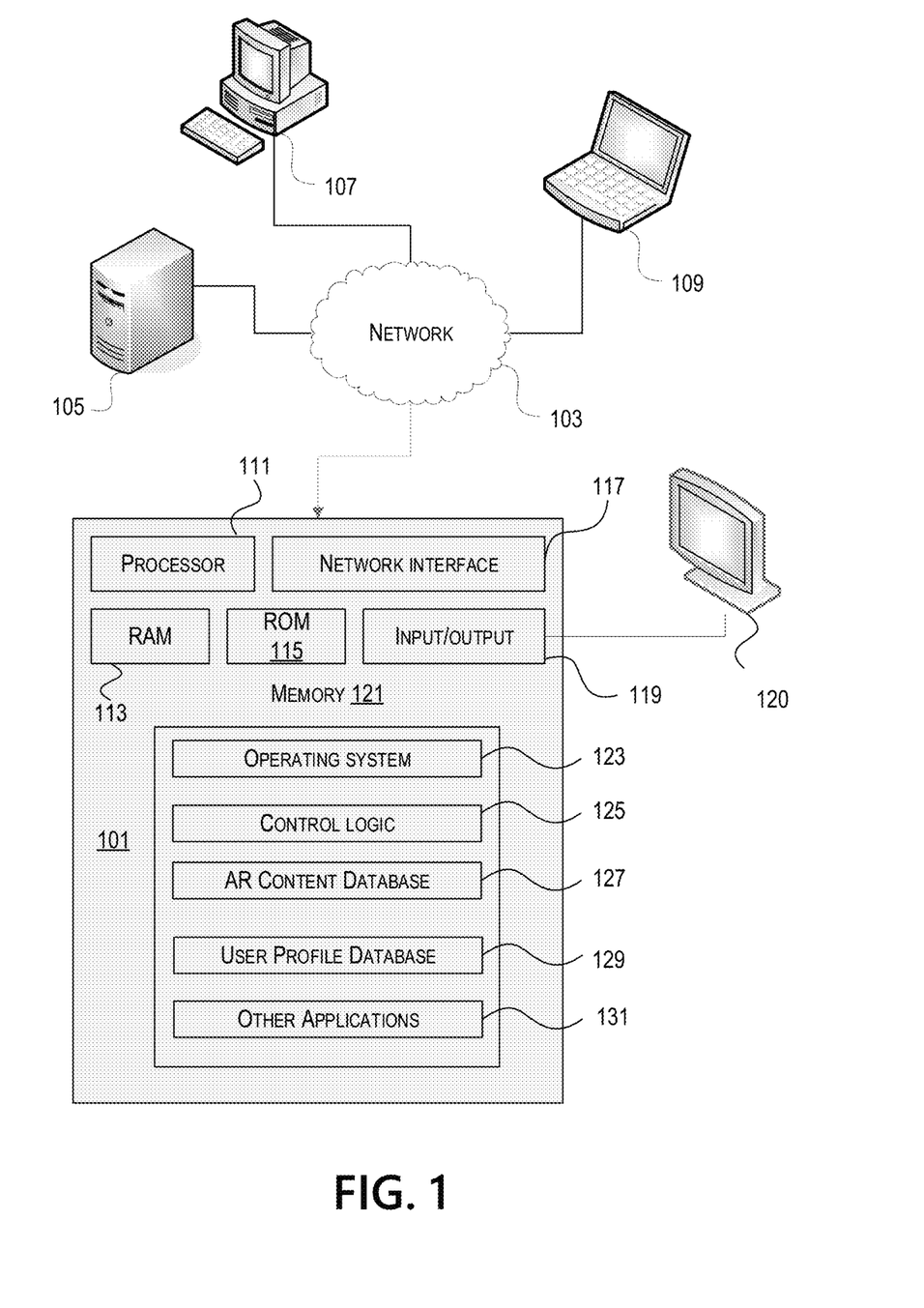
FIG. 1 depicts an example of a computing device that may be used in implementing one or more aspects of the disclosure in accordance with one or more illustrative aspects discussed herein.

FIG. 1 illustrates one example of a computing device 101 that may be used to implement one or more illustrative aspects discussed herein. For example, computing device 101 may, in some embodiments, implement one or more aspects of the disclosure by reading or executing instructions and performing one or more actions based on the instructions. In some embodiments, computing device 101 may represent, be incorporated in, or include various devices such as a desktop computer, a computer server, a mobile device (e.g., a laptop computer, a tablet computer, a smartphone, any other type of mobile computing devices, and the like), or any other type of data processing device.

Computing device 101 may, in some embodiments, operate in a standalone environment. In others, computing device 101 may operate in a networked environment. As shown in FIG. 1, various network nodes 101, 105, 107, and 109 may be interconnected via a network 103, such as the Internet. Other networks may also or alternatively be used, including private intranets, corporate networks, LANs, wireless networks, personal networks (PAN), and the like. Network 103 is for illustration purposes and may be replaced with fewer or additional computer networks. A local area network (LAN) may have one or more of any known LAN topology and may use one or more of a variety of different protocols, such as Ethernet. Devices 101, 105, 107, 109, and other devices (not shown) may be connected to one or more of the networks via twisted pair wires, coaxial cable, fiber optics, radio waves, or other communication media.

As seen in FIG. 1, computing device 101 may include a processor 111, RAM 113, ROM 115, network interface 117, input/output interfaces 119 (e.g., keyboard, mouse, display, printer, etc.), and memory 121. Processor 111 may include one or more computer processing units (CPUs), graphical processing units (GPUs), or other processing units such as a processor adapted to perform computations associating converting information, routing copies of messages, or other functions described herein. I/O 119 may include a variety of interface units and drives for reading, writing, displaying, or printing data or files. I/O 119 may be coupled with a display such as display 120. Memory 121 may store software for configuring computing device 101 into a special purpose computing device in order to perform one or more of the various functions discussed herein. Memory 121 may store operating system software 123 for controlling the overall operation of the computing device 101, control logic 125 for instructing computing device 101 to perform aspects discussed herein. Furthermore, memory 121 may store various databases and applications depending on the particular use, for example, augmented reality (AR) content database 127, user profile database 129, and other applications 131 may be stored in a memory of a computing device used at a server system that will be described further below. Control logic 125 may be incorporated in or may comprise a linking engine that updates, receives, or associates various information stored in the memory 121. In other embodiments, computing device 101 may include two or more of any or all of these components (e.g., two or more processors, two or more memories, etc.) or other components or subsystems not illustrated here.

Devices 105, 107, 109 may have similar or different architecture as described with respect to computing device 101. Those of skill in the art will appreciate that the functionality of computing device 101 (or device 105, 107, 109) as described herein may be spread across multiple data processing devices, for example, to distribute processing load across multiple computers, to segregate transactions based on geographic location, user access level, quality of service (QoS), etc. For example, devices 101, 105, 107, 109, and others may operate in concert to provide parallel computing features in support of the operation of control logic 125.

One or more aspects discussed herein may be embodied in computer-usable or readable data or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer-executable instructions may be stored on a computer-readable medium such as a hard disk, optical disk, removable storage media, solid-state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field-programmable gate arrays (FPGA), and the like. Particular data structures may be used to more effectively implement one or more aspects discussed herein, and such data structures are contemplated within the scope of computer-executable instructions and computer-usable data described herein. Various aspects discussed herein may be embodied as a method, a computing device, a data processing system, or a computer program product.

The data transferred to and from various computing devices may include secure and sensitive data, such as confidential documents, customer personally identifiable information, and account data. Therefore, it may be desirable to protect transmissions of such data using secure network protocols and encryption, or to protect the integrity of the data when stored on the various computing devices. A file-based integration scheme or a service-based integration scheme may be utilized for transmitting data between the various computing devices. Data may be transmitted using various network communication protocols. Secure data transmission protocols or encryption may be used in file transfers to protect the integrity of the data such as, but not limited to, File Transfer Protocol (FTP), Secure File Transfer Protocol (SFTP), or Pretty Good Privacy (PGP) encryption. In many embodiments, one or more web services may be implemented within the various computing devices. Web services may be accessed by authorized external devices and customers to support input, extraction, and manipulation of data between the various computing devices. Web services built to support a personalized display system may be cross-domain or cross-platform, and may be built for enterprise use. Data may be transmitted using the Secure Sockets Layer (SSL) or Transport Layer Security (TLS) protocol to provide secure connections between the computing devices. Web services may be implemented using the WS-Security standard, providing for secure SOAP messages using XML encryption. Specialized hardware may be used to provide secure web services. Secure network appliances may include built-in features such as hardware-accelerated SSL and HTTPS, WS-Security, or firewalls. Such specialized hardware may be installed and configured in front of one or more computing devices such that any external devices may communicate directly with the specialized hardware.

Figure 2:
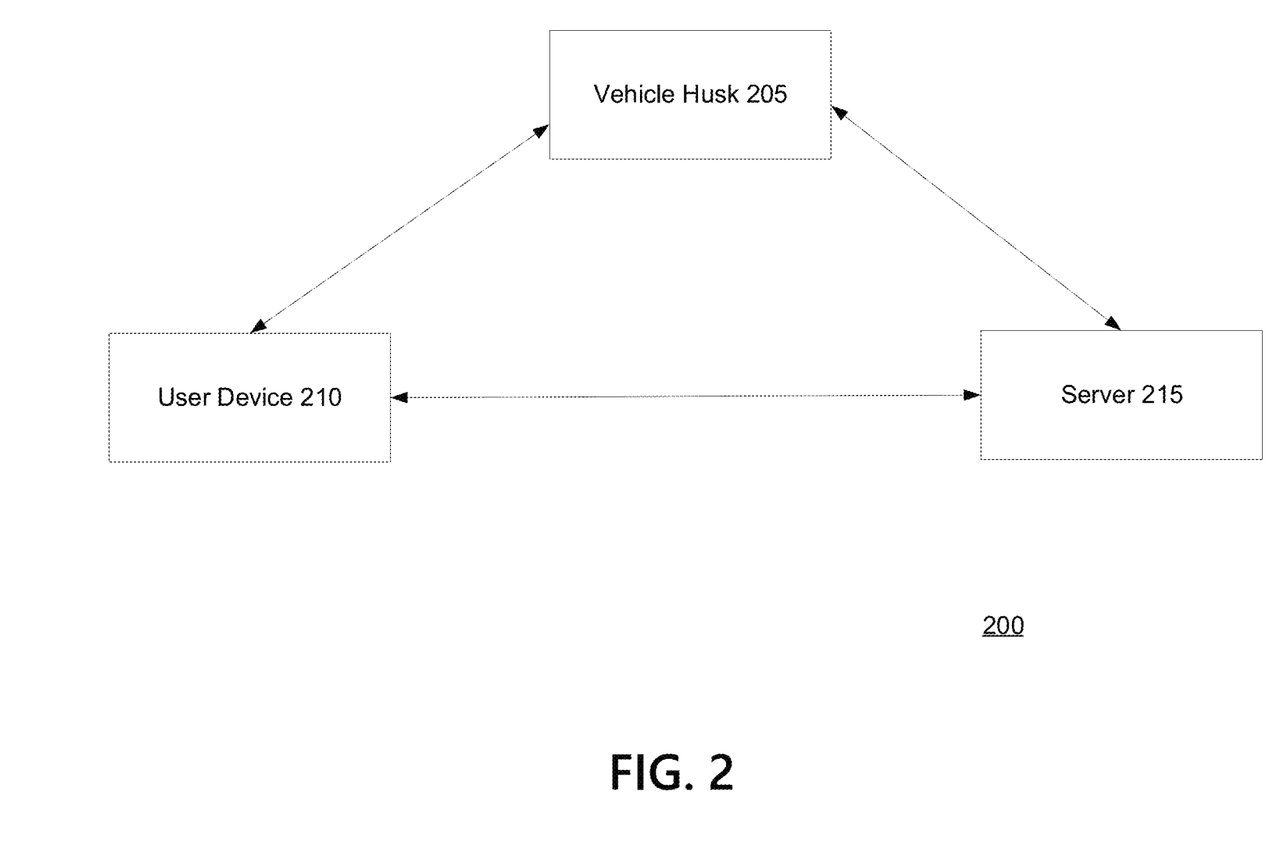
FIG. 2 depicts an example computing environment in accordance with one or more illustrative aspects discussed herein.

FIG. 2 depicts an illustrative computing environment for displaying AR vehicles in accordance with one or more example embodiments. Referring to FIG. 2, computing environment 200 may include a vehicle husk 205, a user device 210, and a server 215.

The user device 210 may be configured to process or display AR content items. For example, the user device 210 may be an AR headset, a pair of AR glasses, or any other personal device (e.g., a mobile phone). The user device 210 may comprise a display device to display an AR interface as discussed in further detail below. The user device 210 may also comprise a sensor (e.g., a camera) to detect the surroundings of a user who holds or wear the user device 210. For example, the user may be a consumer who wants to purchase a car. The user may go to a showroom to view cars of different models. Instead of having all kinds of cars displayed in the showroom, the showroom may have one or more vehicle husks 205. The user may select the model of the car that the user wants to view, and the user device 210 may display, via an AR interface, AR content items of the selected vehicle model.

Figure 3:
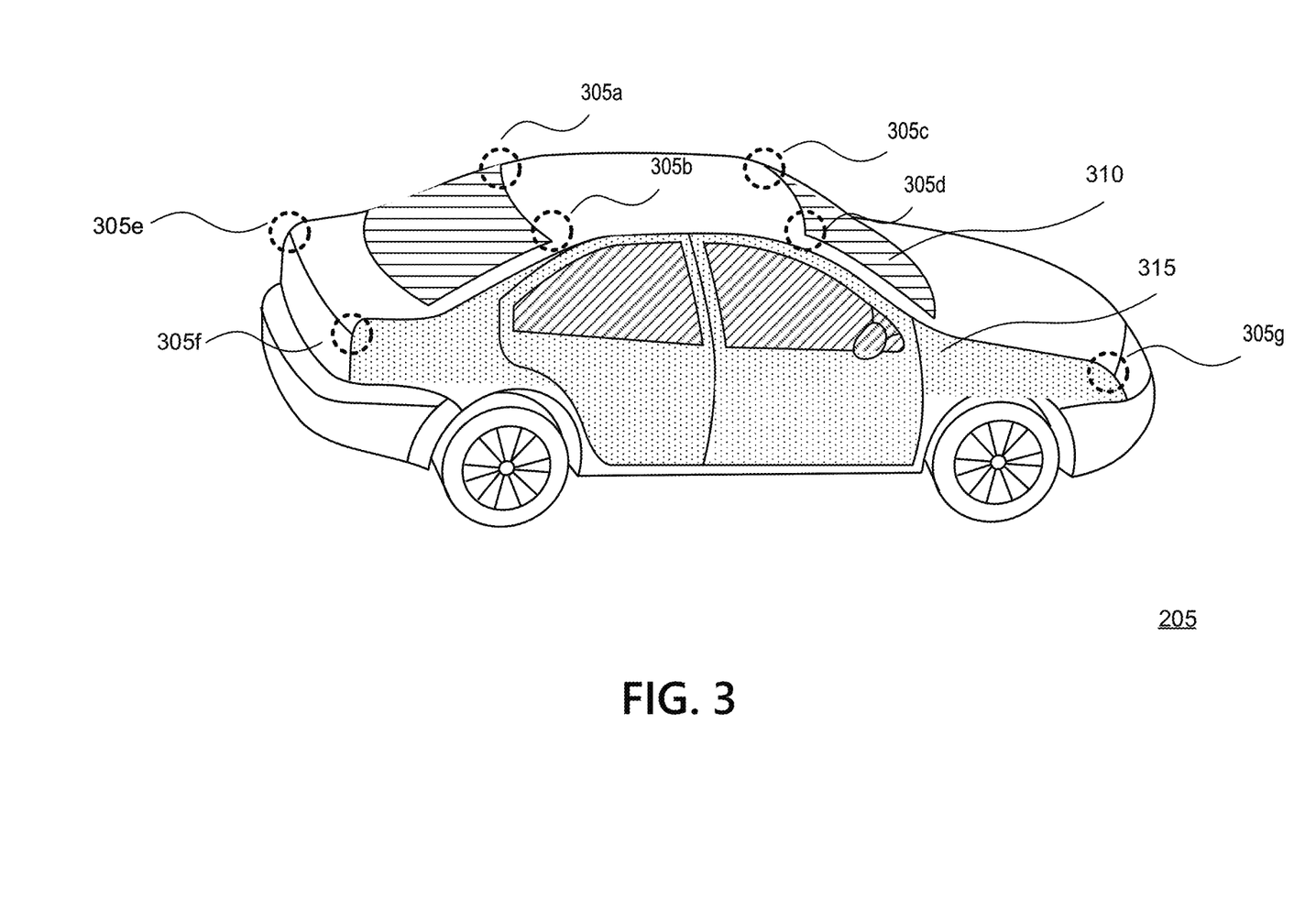
FIG. 3 depicts an example vehicle husk in accordance with one or more illustrative aspects discussed herein.

The AR content items may be displayed based on the relative position between the user's viewpoint and the vehicle husk 205. The vehicle husk 205 may be a vehicle husk 205 as shown in FIG. 3. The AR content items may alter the vehicle husk 205 and be displayed as appears to be overlapped in space with the vehicle husk 205. A plurality of AR content items that collectively depict at least a portion of a car of the selected model may be obtained by the user device 210. Each one of the plurality of AR content items may depict one portion of the car, and may be displayed such that the AR content item appears to be overlapped with the corresponding portion of the vehicle husk 205. For example, an AR content item depicting the left-front door of the vehicle may be displayed such that the AR content item appears to be overlapped with the corresponding portion of the left-front door of the vehicle husk 205. A second AR content item depicting the roof panel may be displayed such that the second AR content item appears to be overlapped with the roof panel of the vehicle husk 205. If the user moves and the relative position between the user's viewpoint and the vehicle husk 205 changes, the AR content items may be modified into a different size or angle so that the space overlapping is maintained. If the user opens the door and looks into the internal space of the vehicle husk 205, AR content items depicting the internal space of the selected vehicle model may also be displayed in a way similar to as discussed above.

It is appreciated that the space overlapping may not be precise. For example, different car models may have different sizes. A first car model may have a door that is slightly larger than the corresponding door of the vehicle husk 205 and therefore some portions of the AR door may be displayed at a space outside the door of vehicle husk 205. Similarly, a second car model may have a door that is slightly smaller than the corresponding door of the vehicle husk 205 and therefore some portions of the door of the vehicle husk 205 may not be covered by the AR door. In such situation, the uncovered portion of the corresponding door of the vehicle husk 205 may be covered by other AR content items depicting the surrounding environment. More than one vehicle husk 205 may be displayed in the showroom. For example, one vehicle husk 205 may be used to display compact cars, another one vehicle husk 205 may be used to display large cars such as an SUV.

In some instances, the AR content items may cover the entire visible space of the vehicle husk 205 such that the user may only see the AR content items, not the real-world vehicle husk 205. This may be helpful particularly if the vehicle husk 205 is a simple husk that does not look like a real car. In other instances, the AR content items may cover a portion of the space of the vehicle husk 205 such that the user may see, via the AR interface, a portion of the vehicle husk 205 in the real world. This may be helpful particularly if the vehicle husk 205 looks similar to a real car of the user's selected model and the AR content items are to modify the appearance of the vehicle husk 205 (e.g., changing the color, adding additional features, etc.).

Displaying AR content items associated with a vehicle overlapped with a real-world vehicle husk 205 may be beneficial because the user may be able to touch and feel the physical vehicle husk 205 while looking at the AR vehicle, which may provide the user a more comprehensive experience as if the user were looking at a real vehicle.

A plurality of physical anchors may be attached to the vehicle husk 205. The physical anchors may be configured to mark different portions of the vehicle husk 205 to facilitate the user device 210 to find the location to display each of the AR content items. FIG. 3 shows an example vehicle husk 205. As shown in FIG. 3, the vehicle husk 205 is viewed from the side. A plurality of physical anchors 305a-305g, 310, and 315 may be attached to the vehicle husk 205. A physical anchor may comprise a visual sign that is visually distinguishable from the surroundings, a signal transmitter (e.g., a Bluetooth transmitter) that transmits signals to the user device 210 to identify its position, or anything else that may be easy to be detected by the user device 210. For example, each of the plurality of physical anchors 305a-305g may be a circle that is painted on the vehicle husk 205. Each of the physical anchors 305a-305g may be configured to mark a key location of the vehicle husk 205. For example, physical anchors 305a to 305d may be configured to mark the four corners of the roof panel of the vehicle husk 205, physical anchors 305e to 305f may be configured to mark the tail lights of the vehicle husk 205, or physical anchor 305g may be configured to mark the right front-light of the vehicle husk 205. Physical anchors may also comprise graphical patterns on the external surface or the internal surface of the vehicle husk 205. For example, as shown in FIG. 3, the side door surface 315 of the vehicle husk 205 may be marked by one graphical pattern (e.g., dots), or the window surface 310 of the vehicle husk 205 may be marked by another pattern (e.g., lines). The roof panel of the vehicle husk 205, or the interior surface of the vehicle husk 205 may each be marked by another different graphical pattern. Physical anchors may also be configured to mark components on the vehicle husk 205 (lights, steering wheel, shift gear, etc.).

Each of the original AR content items may be a high-resolution image and may be a front view of a corresponding portion of the vehicle. One or more databases may be used to store the original AR content items. The databases may be located in the same physical device with the user device 210, or the databases may be located in another physical device that communicates with the user device 210 via a network. For example, a server 215 may comprise or communicate with the one or more databases that store the original AR content items. The user device 210 may communicate with a server 215 to obtain AR content items. The communication may be conducted via a network (e.g., a network 103 as shown in FIG. 1).

The original AR content items may be modified (e.g., the size, angle, or resolution of original AR content items may be adjusted) in real-time based on the relative position between the user's viewpoint and each of the plurality of anchor points. The user device 210 may be held or worn by the user when the user views the vehicle husk 205. The user device 210 may comprise a camera to detect the user's viewpoint. As the user moves, the user device 210 may detect the changes of the relative position between each of the plurality of physical anchors and the user's viewpoint. The original AR content items may be modified accordingly.

The modification may be conducted either by the user device 210 or by the server 215. For example, if the modification is conducted by the server 215, the user device 210 may provide the location information of each of the plurality of anchor points to the server 215. The server 215 may modify the AR content items and then send the modified AR content items to the user device 210 in real-time. If the modification is conducted by the user device 210, the user device 210 may obtain the original AR content items and then conduct the modification based on the location information. The user device 210 may also obtain different original AR content items as the user moves. For example, if the user stands far from the vehicle husk 205, the user device 210 may obtain AR content items that depict the external surface of the AR vehicle. But if the user moves closer to the vehicle husk 205, the user device 210 may obtain original AR content items that depict the internal surface of the AR vehicle, so that if the user opens the door of the vehicle husk 205, AR content items that depict the internal space of the AR vehicle may be displayed via the AR interface.

The user device 210 may further be configured to display price information of the selected vehicle model or budget information of the user who is viewing the vehicle via the user device 210, to facilitate the user's purchase decisions. For example, the user device 210 may add additional features to the AR vehicle and show the price changes based on the additional features, so that the user may have a better understanding of whether the user wants to pay for the additional feature or not. The price information, or the budget information may also be stored in the one or more databases as discussed above.

Figure 4:
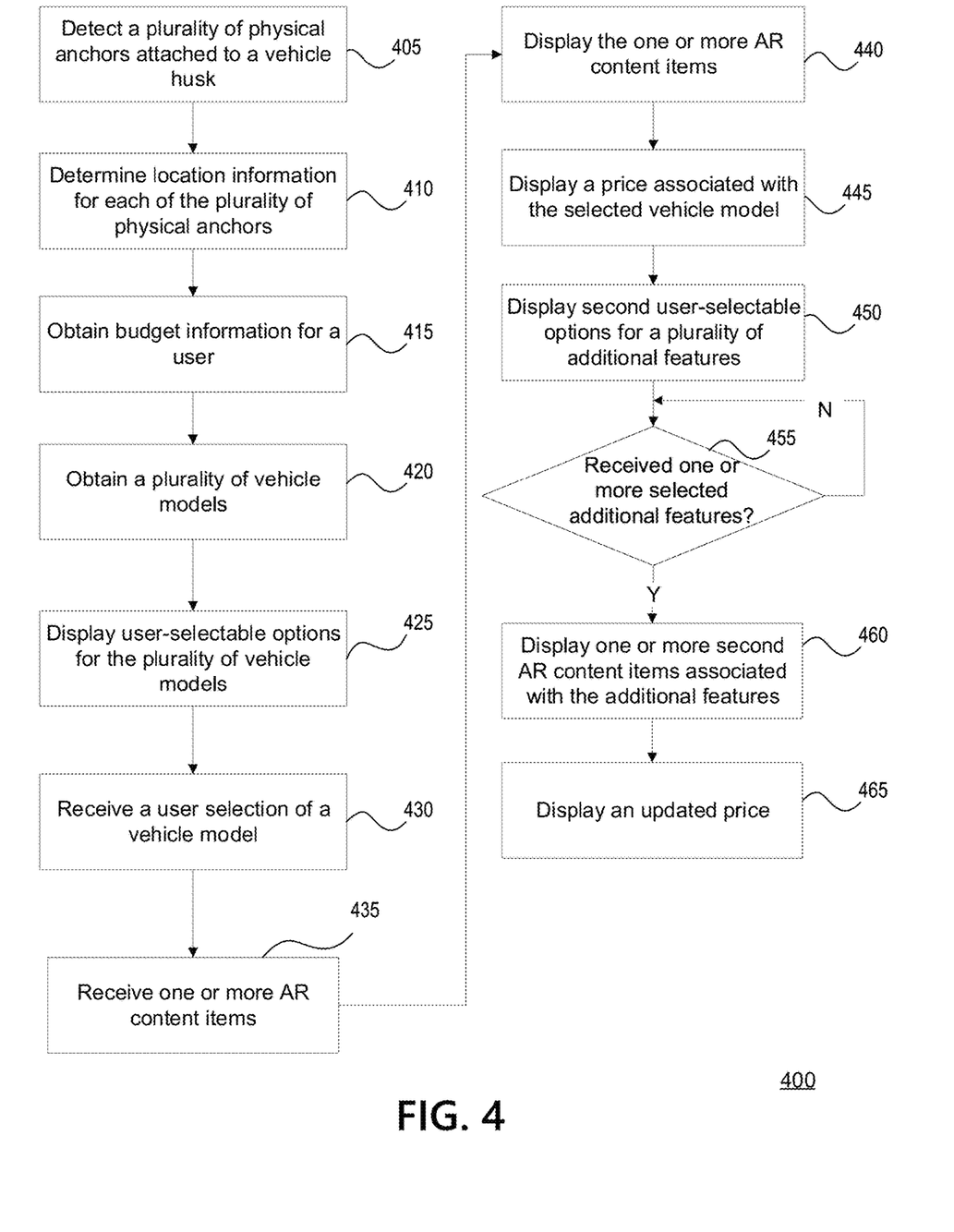
FIG. 4 is a flow diagram of an example method for displaying augmented reality (AR) content items in accordance with one or more illustrative aspects discussed herein.

FIG. 4 is a flow diagram depicting a method 400 for displaying AR content items in accordance with one or more illustrative aspects discussed herein. The steps in method 400 may be performed by a system comprising, for example, the user device 210 and the server 215 as may be shown in FIG. 2.

At step 405, the system (e.g., the user device) may detect a plurality of physical anchors attached to a vehicle husk 205. As may be discussed in connection with FIG. 3, the plurality of physical anchors may comprise anchor points that are configured to identify key positions or components of the vehicle husk 205 (e.g., physical anchors 305a to 305g, 310, and 315 as shown in FIG. 3).

At step 410, the system may determine location information for each of the plurality of physical anchors. The location of each of the plurality of physical anchors may comprise a real-world distance between the user device 210 and the respective physical anchor, the angle between the user's viewpoint and the respective physical anchor, or any other information that may facilitate the display of the AR content items.

At step 415, the system may obtain budget information for the user associated with the user device 210. For example, the budget information may be input by the user. For another example, the system may store a user profile associated with the user. The user profile may store the user's financial information (e.g., the pre-approved loan amount, credit score, etc.). A recommended budget may be calculated based on the user's financial information.

At step 420, the system may obtain, based on the budget information and from a database, the plurality of vehicle models. For example, the plurality of vehicle models may be stored in one or more databases. The databases may also store information associated with the price of each vehicle model, or the original AR content items depicting the corresponding vehicle model. The system may select one or more of the plurality of vehicle models that fall within or in proximate to the user's budget.

At step 425, the system may display user-selectable options for the plurality of vehicle models. The user may be able to select a vehicle model that the user wants to view via the AR interface. The system may also display user-selectable options for additional factors. For example, the system may display options for different features (e.g., external color, internal color, leather seats, a sunroof, etc.) that are available for that vehicle model.

The system may also display user-selectable options for different environmental conditions (e.g., sunny day, rainy day, etc.) under which the user wants to view the vehicle. AR content items corresponding to the options may depict the environmental condition (e.g., a beach, a blue sky, a grey sky, etc.) or may change the appearance of the vehicle under such environmental conditions (e.g., more light if the user selects a sunny day, less light if the user selects a rainy day). Displaying AR vehicles under different environmental conditions may provide the user a better experience to understand the appearance of the car. By contrast, if the user views a car in the real world, the user can only know the appearance of the car under the current environmental condition.

At step 430, the system may receive a user selection, from the plurality of vehicle models, of a vehicle model. The system may also receive a second user selection of an environmental condition or one or more features that can be applied to the vehicle model, as discussed above. The system may obtain AR content items based on the user selection of the vehicle model, the features, or the environmental condition.

At step 435, the system may receive one or more first AR content items corresponding to the selected vehicle model. The one or more first AR content items may comprise images of one or more portions of the vehicle. In the situation where additional features or a particular environmental condition is selected, the system may also receive one or more second AR content items corresponding to the additional features or the environmental condition.

At step 440, the system may display, via an AR interface, the one or more first AR content items positioned relative to the vehicle husk 205 based on the location of each of the plurality of physical anchors (e.g., the relative position between the user's viewpoint each of the plurality of physical anchors). As discussed above in connection with FIGS. 2-3, the AR content items depicting a portion of a vehicle may be displayed such that the AR content items appear to be overlapped in the space with the corresponding portion of the vehicle husk 205. Each of the original AR content items may be a high-resolution image and may be a front view of a corresponding portion of the vehicle. The system may modify the original AR content items (e.g., modify the size, angle, or resolution of the original AR content items) based on the location of each of the plurality of physical anchors and the user's viewpoint. The system may modify the original AR content items in real-time as the relative position between each of the plurality of physical anchors and the user's viewpoint changes.

Figure 5A:
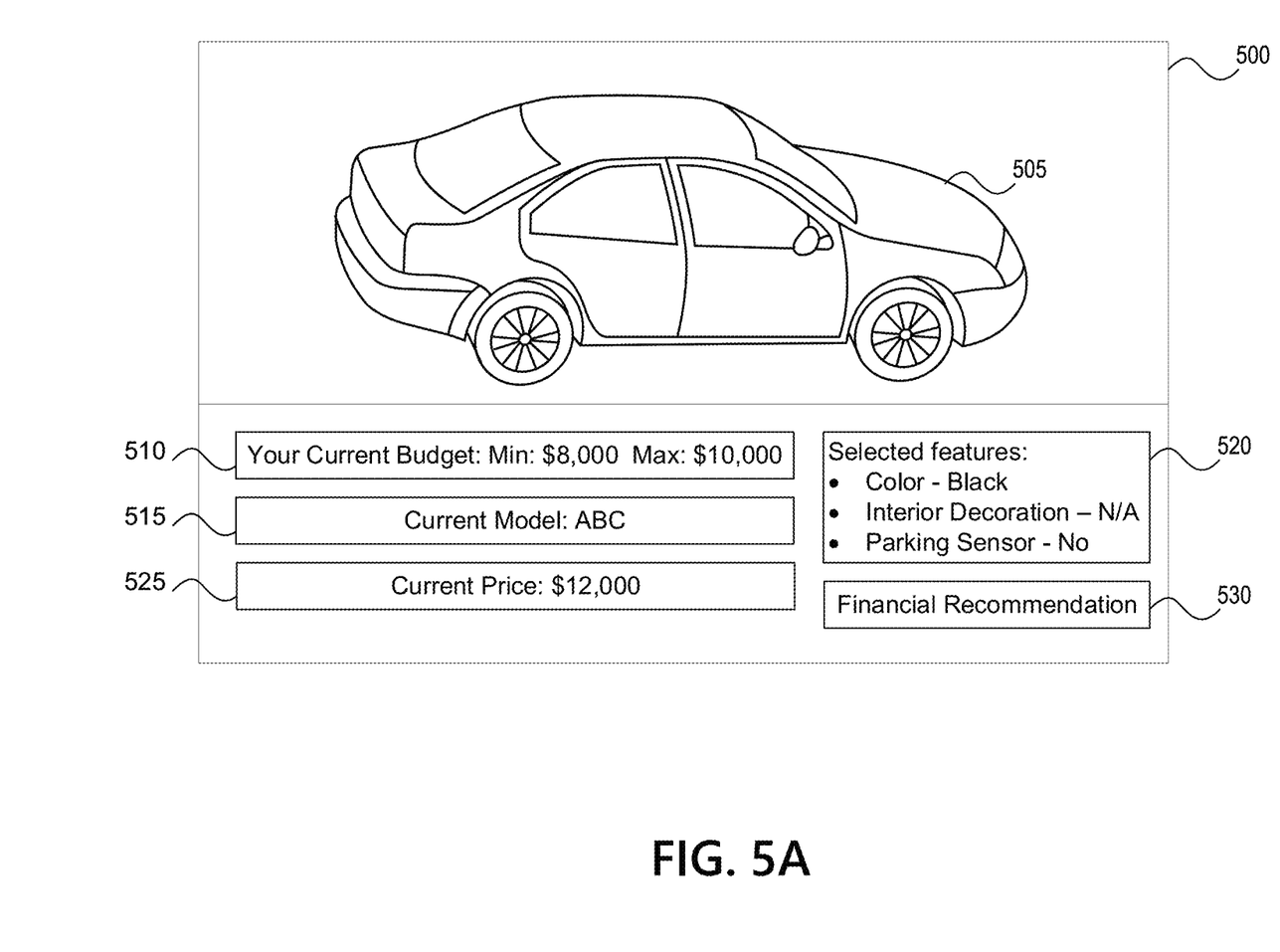
FIG. 5A and FIG. 5B show illustrative user interfaces in accordance with one or more illustrative aspects discussed herein.
Figure 5B:
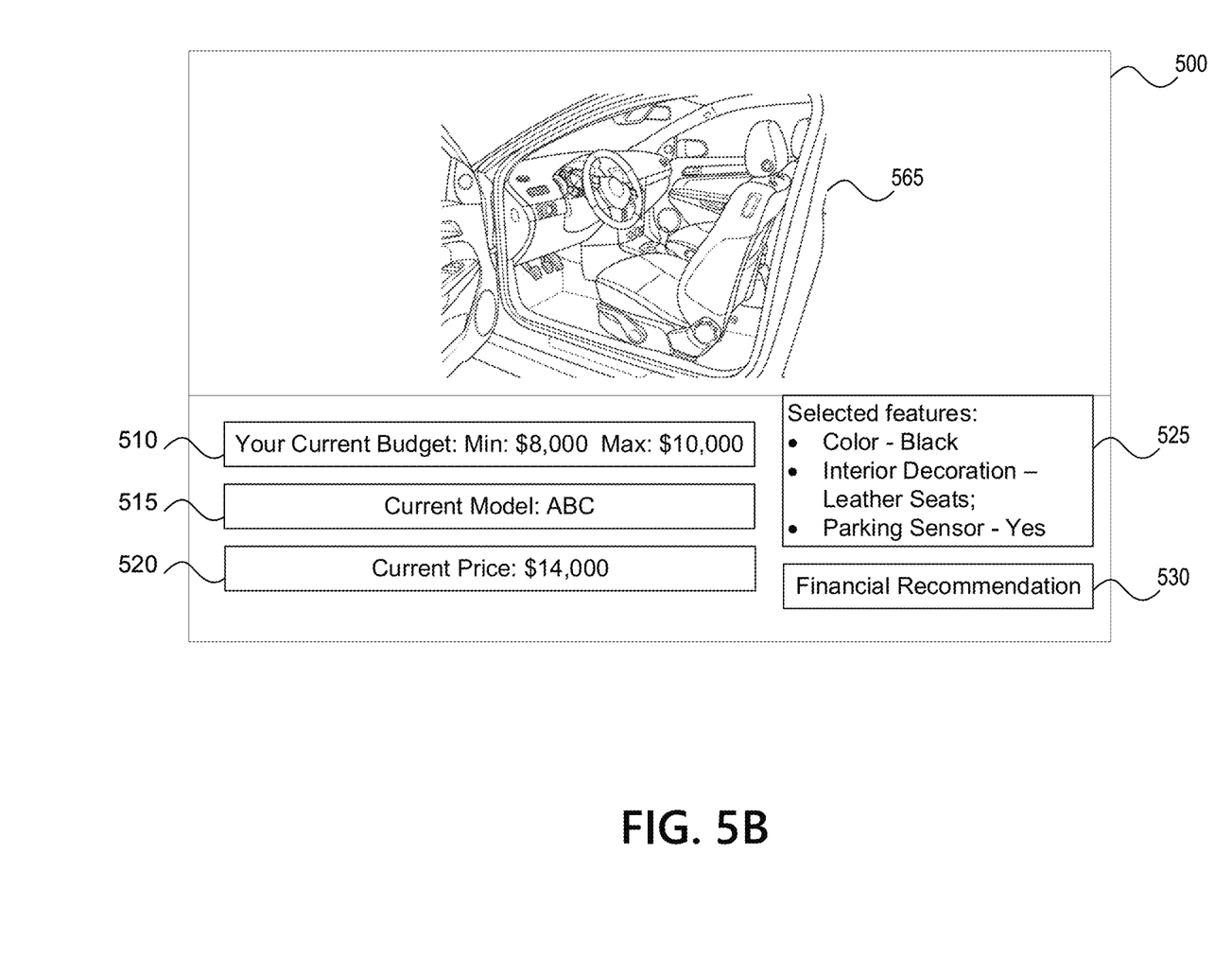

FIGS. 5A to 5B shows example AR interfaces displayed by the system (e.g., by a display device on or associated with the user device 210). As shown in FIG. 5A, the user using the user device 210 (e.g., wearing an AR headset) may approach the vehicle husk 205 from the side, and AR interface 500 may comprise AR content items that display an AR vehicle 505 of the user's selected model from the side. The AR content items may be displayed so that the AR vehicle 505 overlaps with the vehicle husk 205. The user may walk around the vehicle husk 205, and the system may display, via the AR interface 500, modified AR content items as the user moves. As shown in FIG. 5B, the user may approach the left front door of the vehicle husk 205 and open the left front door to see the internal space. The system may display, via the AR interface 500, modified AR content items showing the corresponding portion of the internal space 565 of the AR vehicle.

Referring back to FIG. 4, at step 445, the system may display, via the AR interface, a price associated with the selected vehicle model. The system may also display the budget information of the user, and any other information that the user may want to see while viewing the vehicle. Consistent with the example AR interface 500 shown in FIG. 5A, the AR interface 500 may display a plurality of information bar. For example, information bar 510 may display the user's current budget (e.g., minimum price and maximum price). As may be shown in the information bar 510, the user's current minimum budget may be $8,000, and the user's current maximum budget may be $10,000. Information bar 515 may display the current model of the car that is being viewed. Information bar 520 may display the current features being selected or otherwise displayed. As may be shown in the information bar 520, the user may have selected the color of the car as black. The user may not have selected any interior decoration. In such a situation, if the user looks into the internal space of the vehicle, a default interior decoration may be displayed. The user may also not have selected a parking sensor yet. Information bar 525 may display the current price of the car as currently being displayed. As may be shown in information bar 525, the current price may be $12,000. If the system determines that the current price exceeds the budget of the user, the system may provide, based on the determining, a notification regarding financing recommendations. For example, the system may determine the current price of the car exceeds the maximum budget limitation of the user, and may display an information bar 530 to show a financial recommendation to the user. The financial recommendation may provide advice regarding how to enhance the budget (e.g., the financial options of enhancing the loan amount, how the enhanced loan amount affects monthly payment, etc.).

It is appreciated that the category of information bars, or the value shown in each of the information bars shown in FIGS. 5A to 5B are merely examples. Other categories of information or other values in each category of information may be possible. It is also appreciated that, although all the information bars are shown at the bottom of the AR interface 500, the information bars may be displayed at any other places in the AR interface 500.

At step 450, the system may display second user-selectable options for a plurality of additional features of the selected vehicle model. While the user is viewing the vehicle, the system may show some add-on features to the user. For example, if the user looks into the internal space of the vehicle, the system may provide the option to add a parking sensor with a rearview camera, or the system may provide the option to upgrade the seats with leathers.

At step 455, the system may determine whether one or more additional features are selected. If the system determines that one or more additional features are selected, the method may proceed to step 460. If the system determines that no additional features are selected, the system may keep displaying the AR vehicle without the additional features.

At step 460, the system may display, based on the user's selection of one or more additional features via the AR interface, one or more second AR content items associated with one or more selected additional features.

At step 465, the system may display, via the AR interface and based on the one or more selected additional features, an updated price associated with the selected vehicle model having the one or more additional features. Consistent with the example in FIG. 5B, the updated information bar 525 may display that the user selects interior decoration as leather seats, and adds a parking sensor. The system may update the current price from $12,000 (as may be shown in FIG. 5A) to $14,000 (as may be shown in FIG. 5B).

The steps of method 400 may be modified, omitted, or performed in other orders, or other steps added as appropriate.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing the claims. Accordingly, the scope of the invention should be determined not by the embodiments illustrated, but by the appended claims and their equivalents.

What is claimed is:

1. A method comprising:
   detecting, by a user device and on a vehicle husk, a graphical pattern that corresponds to boundaries of a component surface of the vehicle husk;
   displaying a plurality of options for a component associated with the component surface;
   receiving, based on a selection of one of the plurality of options, one or more augmented reality (AR) content items; and
   displaying, by the user device, based on the graphical pattern, and via an AR interface, the one or more AR content items by overlaying, according to the boundaries, the one or more AR content items on the component surface.

2. The method of claim 1, wherein detecting the graphical pattern comprises detecting a plurality of physical anchors attached to the vehicle husk, and
   wherein displaying the one or more AR content items further comprises:
      determining location information for each of the plurality of physical anchors; and
      displaying, based on the location information, the one or more AR content items.

3. The method of claim 1, further comprising:
   displaying, via the AR interface, a price associated with the selection of one of the plurality of options.

4. The method of claim 3, further comprises:
   determining that the price exceeds a budget of a user associated with the user device; and
   providing, based on the determining, a notification regarding financing recommendations.

5. The method of claim 1, wherein the user device is an AR headset.

6. The method of claim 1, wherein displaying the plurality of options for the component comprises:
   obtaining budget information for a user associated with the user device; and
   obtaining, based on the budget information, the plurality of options for the component.

7. The method of claim 1, further comprising:
   displaying a plurality of second options for a plurality of additional features associated with the selection;
   displaying, based on a second selection of one of the plurality of second options and via the AR interface, one or more second AR content items associated with one or more additional features of the second selection; and
   displaying, via the AR interface, a price associated with the selection having the one or more additional features.

8. The method of claim 1, further comprising:
   receiving a second selection of an environmental condition;
   receiving, based on the second selection, one or more second AR content items; and
   displaying the one or more second AR content items such that the vehicle husk appears to be exposed to the environmental condition.

9. The method of claim 1, wherein the receiving the one or more AR content items comprises:
   receiving a first AR content item corresponding to the component; and
   receiving, based on determining that a surface area of the first AR content item is smaller than a surface area of the component surface, a second AR content item depicting a surrounding environment of the vehicle husk, wherein the second AR content item is configured to cover a portion of the component surface that is not covered by the first AR content item.

10. The method of claim 1, wherein the component corresponds to at least one of:

a door of the vehicle husk;
a window of the vehicle husk; or
a roof panel of the vehicle husk.

11. The method of claim 1, wherein the detecting the graphical pattern comprises detecting that the graphical pattern completely covers a portion of the component surface.

12. A system comprising:
a server; and
a user device comprising:
one or more processors; and
memory storing instructions, when executed by the one or more processors, cause the user device to:
detect, on a vehicle husk, a graphical pattern that corresponds to boundaries of a component surface of the vehicle husk;
display a plurality of options for a component associated with the component surface;
receive, based on a selection of one of the plurality of options and from the server, one or more augmented reality (AR) content items; and
display, based on the graphical pattern and via an AR interface, the one or more AR content items by overlaying, according to the boundaries, the one or more AR content items on the component surface, and
wherein the server is configured to send, to the user device, the one or more AR content items.

13. The system of claim 12, wherein the instructions, when executed by the one or more processors, cause the user device to detect the graphical pattern by detecting a plurality of physical anchors attached to the vehicle husk, and
wherein the instructions, when executed by the one or more processors, cause the user device to display the one or more AR content items by:
determining location information for each of the plurality of physical anchors; and
displaying, based on the location information, the one or more AR content items.

14. The system of claim 12, wherein the instructions, when executed by the one or more processors, further cause the user device to:
display, via the AR interface, a price associated with the selection of one of the plurality of options.

15. The system of claim 14, wherein the instructions, when executed by the one or more processors, further cause the user device to:
determine that the price exceeds a budget of a user associated with the user device; and
provide, based on the determining, a notification regarding financing recommendations.

16. The system of claim 12, wherein the instructions, when executed by the one or more processors, cause the user device to display the plurality of options for the component by:

obtaining budget information for a user associated with the user device; and
obtaining, based on the budget information, the plurality of options for the component.

17. A non-transitory computer-readable medium storing instructions, when executed by one or more processors, cause:
detecting, on a vehicle husk, a graphical pattern that corresponds to boundaries of a component surface of the vehicle husk;
displaying a plurality of options for a component associated with the component surface;
receiving, based on a selection of one of the plurality of options, one or more augmented reality (AR) content items; and
displaying, based on the graphical pattern and via an AR interface, the one or more AR content items by overlaying, according to the boundaries, the one or more AR content items on the component surface.

18. The non-transitory computer-readable medium of claim 17, wherein the instructions, when executed by the one or more processors, cause detecting the graphical pattern by detecting a plurality of physical anchors attached to the vehicle husk, and
wherein the instructions, when executed by the one or more processors, cause displaying the one or more AR content items by:
determining location information for each of the plurality of physical anchors; and
displaying, based on the location information, the one or more AR content items.

19. The non-transitory computer-readable medium of claim 17, wherein the instructions, when executed by the one or more processors, further cause:
displaying, via the AR interface, a price associated with the selection of one of the plurality of options.

20. The non-transitory computer-readable medium of claim 19, wherein the instructions, when executed by the one or more processors, further cause:
determining that the price exceeds a budget of a user associated with the selection; and
providing, based on the determining, a notification regarding financing recommendations.

21. The non-transitory computer-readable medium of claim 17, wherein the instructions, when executed by the one or more processors, cause displaying the plurality of options for the component by:
obtaining budget information for a user associated with the selection; and
obtaining, based on the budget information, the plurality of options for the component.

* * * * *